(12) United States Patent
Tanase et al.

(10) Patent No.: US 6,820,893 B2
(45) Date of Patent: Nov. 23, 2004

(54) HEAD PROTECTION AIR BAG DEVICE

(75) Inventors: Toshinori Tanase, Nishikasugai-gun (JP); Hiroyuki Takahashi, Toyota (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 185 days.

(21) Appl. No.: 10/055,345

(22) Filed: Jan. 25, 2002

(65) Prior Publication Data

US 2002/0096863 A1 Jul. 25, 2002

(30) Foreign Application Priority Data

Jan. 25, 2001 (JP) ..................... P2001-016893
Mar. 16, 2001 (JP) ..................... P2001-077111

(51) Int. Cl.⁷ .............................................. B60R 21/22
(52) U.S. Cl. ........................... 280/730.2; 280/743.1
(58) Field of Search ........................ 280/728.1, 728.2, 280/730.2, 735, 743.1

(56) References Cited

U.S. PATENT DOCUMENTS

| | | | | |
|---|---|---|---|---|
| 5,899,491 A | * | 5/1999 | Tschaeschke | 280/730.2 |
| 6,010,149 A | * | 1/2000 | Riedel et al. | 280/730.2 |
| 6,042,141 A | | 3/2000 | Welch et al. | |
| 6,224,091 B1 | * | 5/2001 | Eyrainer et al. | 280/730.2 |
| 6,231,073 B1 | * | 5/2001 | White, Jr. | 280/730.2 |
| 6,250,533 B1 | * | 6/2001 | Otterbein et al. | 228/47.1 |
| 6,293,581 B1 | * | 9/2001 | Saita et al. | 280/730.2 |
| 6,308,982 B1 | * | 10/2001 | Wallner et al. | 280/730.2 |
| 6,361,069 B1 | * | 3/2002 | Saito et al. | 280/730.2 |
| 6,371,512 B1 | * | 4/2002 | Asano et al. | 280/730.2 |
| 6,460,877 B2 | * | 10/2002 | Tanabe et al. | 280/729 |
| 6,460,879 B2 | * | 10/2002 | Tanase et al. | 280/730.2 |
| 6,530,595 B2 | * | 3/2003 | Masuda et al. | 280/730.2 |
| 6,554,314 B1 | * | 4/2003 | Uchiyama et al. | 280/730.2 |

FOREIGN PATENT DOCUMENTS

| | | |
|---|---|---|
| GB | 2 314 300 | 12/1997 |
| GB | 2 327 066 | 1/1999 |
| GB | 2 344 792 | 6/2000 |
| JP | 2000-335356 | 12/2000 |
| WO | WO 96/26087 | 8/1996 |
| WO | WO 00/63048 | 10/2000 |

\* cited by examiner

Primary Examiner—Paul N. Dickson
Assistant Examiner—Toan C To
(74) Attorney, Agent, or Firm—Posz & Bethards, PLC

(57) ABSTRACT

In a head protection air bag device, a folded air bag receives inflation gas, and when its inflating operation is completed, inflation parts of front and rear inflatable protective shielding parts as partitioned by partitioning parts generate tensions in the longitudinal direction in the front and rear inflatable protective shielding parts per se. The front and rear inflatable protective shielding parts are interconnected to each other by inflation communicating part under a plate-like portion which blocks the inflow of the inflation gas, at the lower fringe side of the air bag. The inflation communication parts are longitudinally disposed along the lower fringe side of the air bag. Therefore, the front and rear inflatable protective shielding parts are interconnected without reducing the tensions in those parts. As a result, a high tension having the longitudinal direction is generated in the entire lower fringe of the air bag.

3 Claims, 9 Drawing Sheets

HEAD PROTECTION AIR BAG DEVICE

The present application is based on Japanese Patent Applications Nos. 2001-16893 and 2001-77111, which are incorporated herein by reference.

BACKGROUND OF THE INVENTION

1. Field of the Invention

The present invention relates to a head protection air bag device carried on a motor vehicle. More particularly, the invention relates to a head protection air bag device in which an air bag, while being folded, is stored along the upper fringe of an opening on the cabin-inside or indoor side of a vehicle, and when receiving inflation gas, the air bag develops and inflates to cover the opening.

2. Description of the Related Art

The air bag for the conventional head protection air bag device is provided with inflatable protective shielding parts which receive inflation gas and inflate to cover the openings on the cabin-inside side, as disclosed in international publication WO96/26087 and GB2314300.

The inflatable protective shielding part includes a plurality of inflation parts which are arranged in the vehicle longitudinal direction and vertically expandable so as to generate a tension in the vehicle longitudinal direction.

The air bag has a gas-inflow section through which inflation gas is introduced into the airbag, and a non gas-inflow section which rejects the inflow of the inflation gas. The non gas-inflow section includes a periphery part surrounding the gas-inflow section, and partitioning parts being vertically disposed and defining the inflation parts.

With such a structure, at the time of inflating operation, when each inflation part inflates, a distance between the partitioning parts located at the front and rear of each inflation part is reduced, and a distance between the periphery parts is also reduced. As a result, a tension having a longitudinal direction of the vehicle is generated in the inflatable protective shielding parts, so that the inflatable protective shielding parts are restrained from moving out of the car cabin at the time of restricting the passenger.

However, the conventional air bag needs improvement in the further increase of the tension generated in the lower fringe of the air bag.

In another conventional head protection air bag device, an air bag which is stored, while being folded, along the upper fringe of an opening on the cabin-inside or indoor side and on the side of seat recliners, and when receiving inflation gas, the air bag develops and inflates to cover the opening, as disclosed in Japanese Patent Publication No. 2000-335356.

In a case where the air bag is designed to have such a configuration at the completion of developing and inflating operations that its vertical dimension is large so as to cover the openings on the cabin-inside side, the following disadvantage arises. At the time of its developing/inflating operation, the air bag interferes with the seat recliner, particularly the upper end of the side surface of the seat recliner, whereby the developing/inflating operation is possibly hindered.

SUMMARY OF THE INVENTION

An object of the present invention is to provide a head protection air bag device which is able to generate high tension having a longitudinal direction of the vehicle in the lower fringe side of the air bag at the completion of developing and inflating operations of the air bag.

Another object of the present invention is to provide a head protection air bag device which enables the air bag to be developed and inflated without any interference with the seat recliners, even in such a construction that the air bag broadly covers the openings on the cabin-inside side.

According to the present invention, there is provided a first head protection air bag device having an air bag which is stored, while being folded, along the upper fringe of an opening on the cabin-inside or indoor side of a vehicle, when receiving inflation gas, the air bag developing and inflating to cover the opening, wherein the air bag includes a gas-inflow section which inflates so as to separate a cabin-inside side wall and a cabin-outside side wall one from the other, and a non gas-inflow section which rejects inflation gas, the gas-inflow section includes a plurality of inflatable protective shielding parts being disposed such that the inflatable protective shielding parts are longitudinally spaced from one another and cover the opening, and inflation communicating parts, each inflatable protective shielding part includes a plurality of inflating parts which are arranged in the longitudinal direction and vertically expandable so as to generate a tension in the longitudinal direction, the non gas-inflow section includes a periphery part surrounding the non gas-inflow section, a plate-like portion disposed between the inflatable protective shielding parts, and partitioning parts being vertically disposed and defining the inflation parts in the inflatable protective shielding parts, the inflation communicating parts are disposed in the lower fringe side of the air bag under the plate-like portion and along the lower fringe of the air bag, the inflatable protective shielding parts, which are adjacently located with the plate-like portion being interposed therebetween, are communicated with each other by the inflation communicating part, and the lower ends of the inflation parts are closed at the lower-edge side parts of the periphery parts.

In the first head protection air bag device, it is preferable that one of the ends of the air bag is coupled to a body of the vehicle by coupling parts extending away from the gas-inflow section and the coupling parts are coupled to the lower-edge side part of the periphery parts at the completion of the developing and inflating operation.

In the first head protection air bag device, it is preferable that the inflatable protective shielding parts, which are adjacently located with the plate-like portion being interposed therebetween, include inflow ports allowing the inflation gas to flow thereinto which are located above the plate-like portion.

In the specification, the terms "the longitudinal direction" and "the vertical direction" mean respectively the "front and back direction" and the "upward and downward direction" of the vehicle with the head protection airbag device installed thereto.

In the first head protection air bag device, when inflation gas is made to flow into the air bag and the developing and inflating operation of the air bag is completed, the inflation parts partitioned by the partitioning parts in each inflatable protective shielding part generate a tension having a longitudinal direction in the inflatable protective shielding part per se. The inflatable protective shielding parts are interconnected by the inflation communicating parts in the lower fringe side of the air bag.

The inflation communicating parts are longitudinally disposed along the lower fringe of the air bag, and completes the inflation of the air bag. Therefore, the inflatable protective shielding parts are interconnected without reducing the tensions in those parts. As a result, a high tension having the longitudinal direction is generated in the entire lower fringe of the air bag.

The inflation parts are interconnected such that only those inflation parts adjacent to each other are merely interconnected by the inflation communicating part. The remaining inflation parts are closed at the lower edges of the periphery parts. Accordingly, even if the inflation communicating parts are provided, the tension having a longitudinal direction in the inflatable protective shielding part per se, which is generated by the inflation parts, is kept in a high level.

Accordingly, the head protection air bag device of the invention is capable of generating a high tension having the longitudinal direction of the vehicle in the lower fringe side of the air bag at the completion of developing and inflating the air bag.

Particularly in the lower side of the plate-like portion in the air bag, the inflation communicating part completes the inflating operation in a state that high tension having the longitudinal direction is generated in the lower edge side of the air bag. Accordingly, the air bag is high in rigidity, and difficult to be bent to the outside of the car cabin. Therefore, even if the passenger is greatly moved out of the car cabin and pressed against the lower end in the vicinity of the lower end of the plate-like portion, the passenger can be restrained reliably.

If attempt is made to obtain high tension by locating anew an inflation part at the position of the plate-like portion in the air bag of the invention, which the tension is high as high as in the air bag of the invention, if a strong pressing force acts the lower edge of the inflation part located anew in a cabin-outside direction, the inflation parts are specially firmly coupled to each other at their lower ends, the lower end of the newly installed inflation part is inevitably bent to the cabin-outside. Accordingly, the operation and effect of the invention cannot be obtained.

If the inflation part is located at the position of the plate-like portion in the air bag of the invention, the volume of the gas-inflow section increases, so that the time from the inflation start till inflating operation ends is increased. On the other hand, in the air bag of the invention, the plate-like portion in the non gas-inflow section which rejects the inflow of inflation gas is disposed above the inflation communicating parts. The volume of the gas-inflow section is small when comparing with the case where the inflation part is located at the position of the plate-like portion. Accordingly, the time from the inflation start till inflating operation ends is reduced.

Further, in the case that the coupling parts longitudinally extending away from the gas-inflow section and coupled to a body of the vehicle are coupled to the lower-edge side part of the periphery parts, much higher tension of a longitudinal direction of the vehicle may be generated in the lower fringe side of the air bag at the completion of developing and inflating operations of the air bag.

Still further, in the case that the inflatable protective shielding parts, which are adjacently located with the plate-like portion being interposed therebetween, receive the inflation gas through the inflow ports located above the plate-like portion, a flowing distance of the inflation gas till it reaches the front inflatable protective shielding part, which was set to be long, is shorter than that in the air bag in which the inflation gas is fed into air bag from one of the ends of the gas-inflow section. Accordingly, the time taken from the inflation start of the whole gas-inflow section till inflating operation ends is reduced.

Further, there is provided a second head protection air bag device having an air bag which is stored, while being folded, along the upper fringe of an opening on the cabin-inside or indoor side and on the side of seat recliners, and when receiving inflation gas, the air bag develops and inflates to cover the opening, wherein the air bag includes a gas-inflow section through which the inflation gas is introduced into the air bag, and a periphery part surrounding the gas-inflow section, the gas-inflow section is partitioned, by partitioning/coupling parts coupling the cabin-inside side wall with the cabin-outside side wall, into a plurality of inflation parts, which are arranged side by side in the longitudinal direction, and inflate when receiving the inflation gas so as to separate the cabin-inside side wall and the cabin-outside side wall one from the other, and the inflation parts located on the side of the seat recliners serve as lower-end displacement inflation parts located such that the lower ends thereof are higher than the lower ends of the other inflation parts, thereby preventing it from interfering with the upper ends of the seat recliners.

In the second head protection air bag device, it is preferable that parts of the periphery part, which are located under the lower-end displacement inflation parts of the air bag, are substantially level with parts of the periphery parts under the inflation parts, which are adjacent to the lower-end displacement inflation parts, in the lower edge height, when the air bag is developed to be flat in a non inflating state.

In the head protection air bag device, it is preferable that the gas-inflow section includes a front-seat inflow section and a rear-seat inflow section, which are respectively provided covering openings on the side of the front seat and rear seat, the front-seat inflow section and the rear-seat inflow section include, respectively, lower-end displacement inflation parts corresponding to the front seat and the rear seat, and a width dimension of the lower-end displacement inflation part of the front-seat inflow section as longitudinally viewed is larger than that of the lower-end displacement inflation part of the rear-inflow section as longitudinally viewed.

In the second head protection air bag device, it is preferable that the air bag introduces the inflation gas thereinto both at the time of side collision and at the time of the roll-over.

In the second head protection air bag device according to the present invention, the lower-end displacement inflation parts are disposed such that the lower ends of them are located at positions above the lower ends of the remaining inflation parts, when the folded air bag receives the inflation gas, and its developing/inflating operation is completed. With this feature, the air bag inflates without any interference with the upper ends of the seat recliners. The remaining inflation parts are disposed such that the lower ends of them are located at positions lower than the upper ends of the seat recliners. Accordingly, those may be developed and inflated so as to broadly cover the openings on the cabin-inside side. The developing/inflating operation of the entire air bag may be completed without any hindrance.

Accordingly, in the head protection air bag device according to the invention, even in such a construction that the air bag broadly covers the openings on the cabin-inside side, the air bag may be developed and inflated without any interference of the seat recliners.

Further, even if the lower-end displacement inflation parts are disposed such that the lower ends of them are located at positions above the lower ends of the remaining inflation parts when the developing/inflating operation of the air bag is completed, in the case that the parts of the lower-edge side part under the lower-end displacement inflation parts interfere with the upper ends of the seat recliners and are disposed, while being bent, so that their lower edge side are made to be coincident, as much as possible, with the parts of the lower-edge side part of the periphery parts at the lower side of the adjacent inflation parts, the head protection air bag device is capable of generating the tension having the longitudinal direction in the lower edge side of the air bag. When the developing/inflating operation is completed, the sideways movement of the air bag is restricted and the passenger is reliably restrained even if a pressing force acts the air bag in a cabin-inside or a cabin-outside direction.

Still further, in the case that an adjustable range of a front seat in the longitudinal direction is longer than of a rear seat, and that even when the front seat is adjusted over a long range in the longitudinal direction and the width dimension (as longitudinally viewed) of the lower-end displacement inflation part of the front-seat inflow part is larger than that of the lower-end displacement inflation part of the rear-seat inflow part, when the lower-end displacement inflation part of the front-seat inflow part is developed and inflated, the lower end of the lower-end displacement inflation part is prevented from interfering with the upper end of the seat recliner of the adjusted front seat. As a result, the third head protection air bag device is smoothly operable even when it is mounted on the vehicle provided with the front and rear seats.

Still further, in the case that the both at the time of side collision and at the time of the roll-over, the air bag is developed and inflated to broadly cover the openings on the cabin-inside side, the air bag reliably protects the passenger at the time of over rolling as well as at the time of the side-collision of the vehicle.

Features and advantages of the invention will be evident from the following detailed description of the preferred embodiments described in conjunction with the attached drawings.

DETAILED DESCRIPTION OF THE PREFERRED EMBODIMENTS

The preferred embodiments of the present invention will be described with reference to the accompanying drawings.

Figure 1:
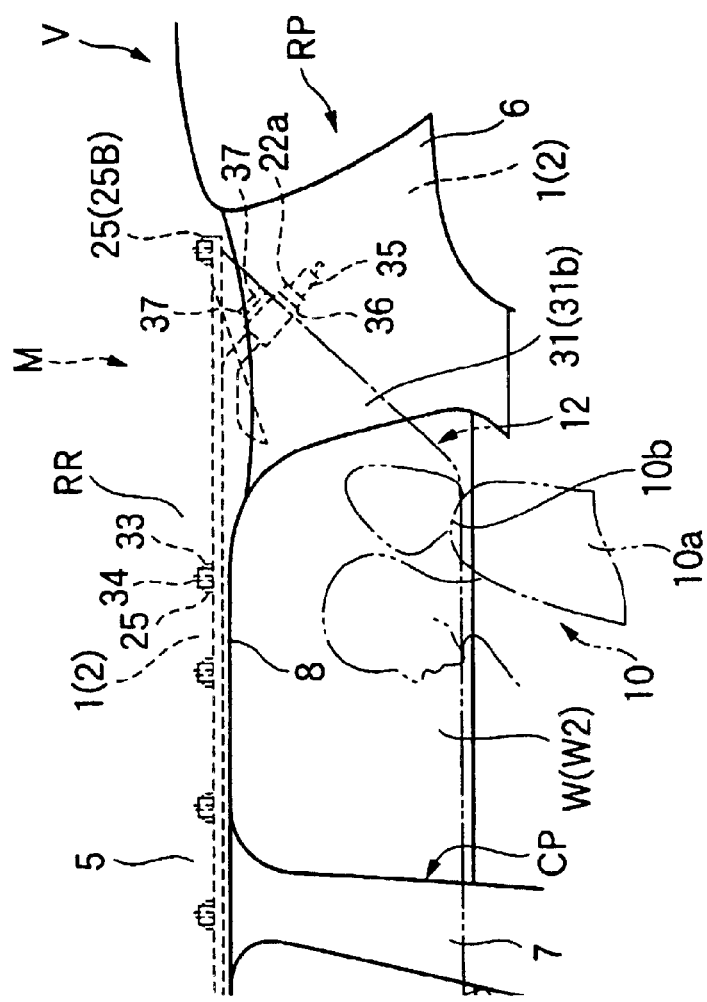
FIG. 1 is a front view showing a use of the head protection air bag device as viewed from the cabin-inside side, which is an embodiment of the present invention.

In a head protection air bag device M of the embodiment, as shown in FIG. 1, an air bag 12, while being folded, is stored in a region including a lower edge of a front pillar FP, a lower edge of a roof side rail RR and an upper part of a rear pillar RP, which are arranged along the peripheral edge of the upper fringes of openings W of doors and windows on the indoor side of a vehicle V. The vehicle V includes a front seat 9 and a rear seat 10. The air bag 12 covers an opening W1 in the upper part of the front seat 9 side and an opening W2 in the upper part of the rear seat 10 side, when the air bag is developed and inflated.

The head protection air bag device M is made up of the air bag 12, an inflator 35, mounting brackets 33 and 36, an air bag cover 8, a side collision sensor 41, a roll-over sensor 42 and a control unit 43.

The inflator 35, as shown in FIG. 1, is of a cylinder type in which inflation gas is supplied to the folded air bag 12. An inflow port 22*a* of the air bag 12, which will be described later, is attached to the inflator. The inflator 35 is operated when receiving a drive signal derived from the control unit 43.

The control unit 43 outputs a drive signal to the inflator 35 when the control unit receives a side collision detect signal from the side collision sensor 41 and when it receives a roll-over detect signal, which predicts a roll-over (turn-over) of the vehicle V, from the roll-over sensor 42. The side collision sensor 41, the roll-over sensor 42 and the control unit 43 are located at predetermined positions of the vehicle V and are electrically connected with one another. The inflator 35 is also electrically connected to the control unit 43.

The mounting bracket 36 is made with a metal sheet, and holds down the inflator 35 to which the inflow port 22*a* of the air bag 12 is attached, from the outer peripheral side the inflator 35, for each inflow port 22*a*. The mounting bracket is mounted on a sheet metal inner panel 2 of a vehicle body 1 on the indoor side of the rear pillar RP by utilizing two mounting bolts 37.

Figure 2:
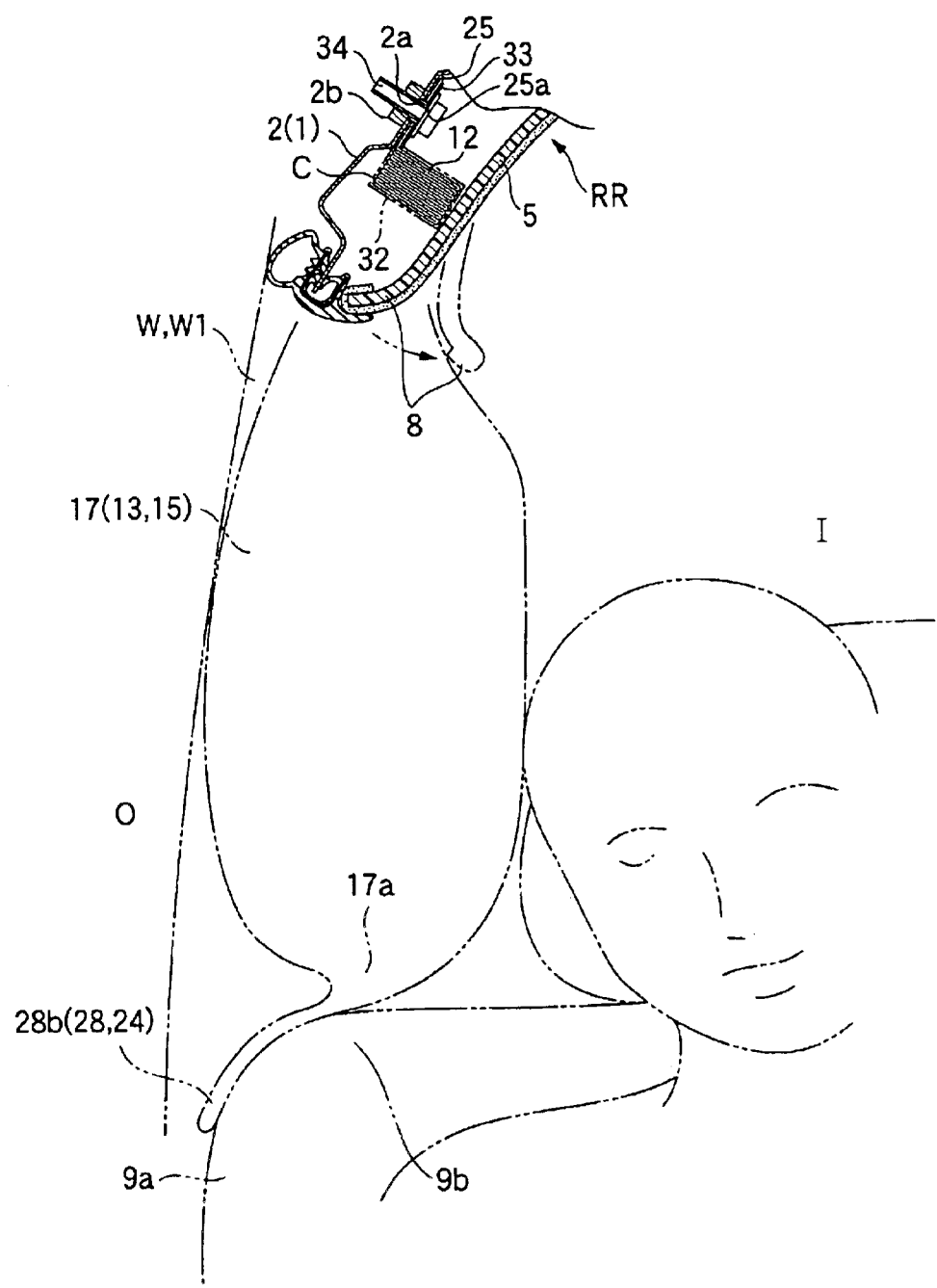
FIG. 2 is an enlarged, cross sectional view taken on line II—II in FIG. 1, an inflated state of the air bag being indicated by two-dot chain lines.

As shown in FIGS. 1 and 2, the mounting brackets 33 made with metal sheets sandwich mounting parts 25 of the air bag 12 to be described later. The mounting brackets 33 each include an inner plate on the cabin outside "I" and an outer plate on the cabin outside "O" (those plates are not shown). The mounting parts 25 are mounted on the inner panel 2 in a manner that the mounting parts 25 are each sandwiched by the inner and outer plates, and in this state, mounting bolts 34 are inserted into mounting holes 25*a* of the mounting parts 25 and mounting holes (not shown) formed in the mounting brackets 33, and screwed into nuts 2*b* fastened to the periphery edges of mounting holes 2*a* of the inner panel 2.

As shown in FIGS. 1 and 2, the air bag cover 8 is defined by the lower edges of a pillar garnish 4 located on the front pillar FP and a roof head lining 5 located on the roof side rail RR. The front pillar garnish 4 and the roof head lining 5 both being made of synthetic resin are secured to the inner panel 2 of the vehicle body 1 on the indoor side of the front pillar FP and the roof side rail RR. The roof head lining 5 is disposed ranging from an upper part of the front pillar FP to an upper part of the rear pillar RP, through an upper part of the center pillar CP.

Figure 3:
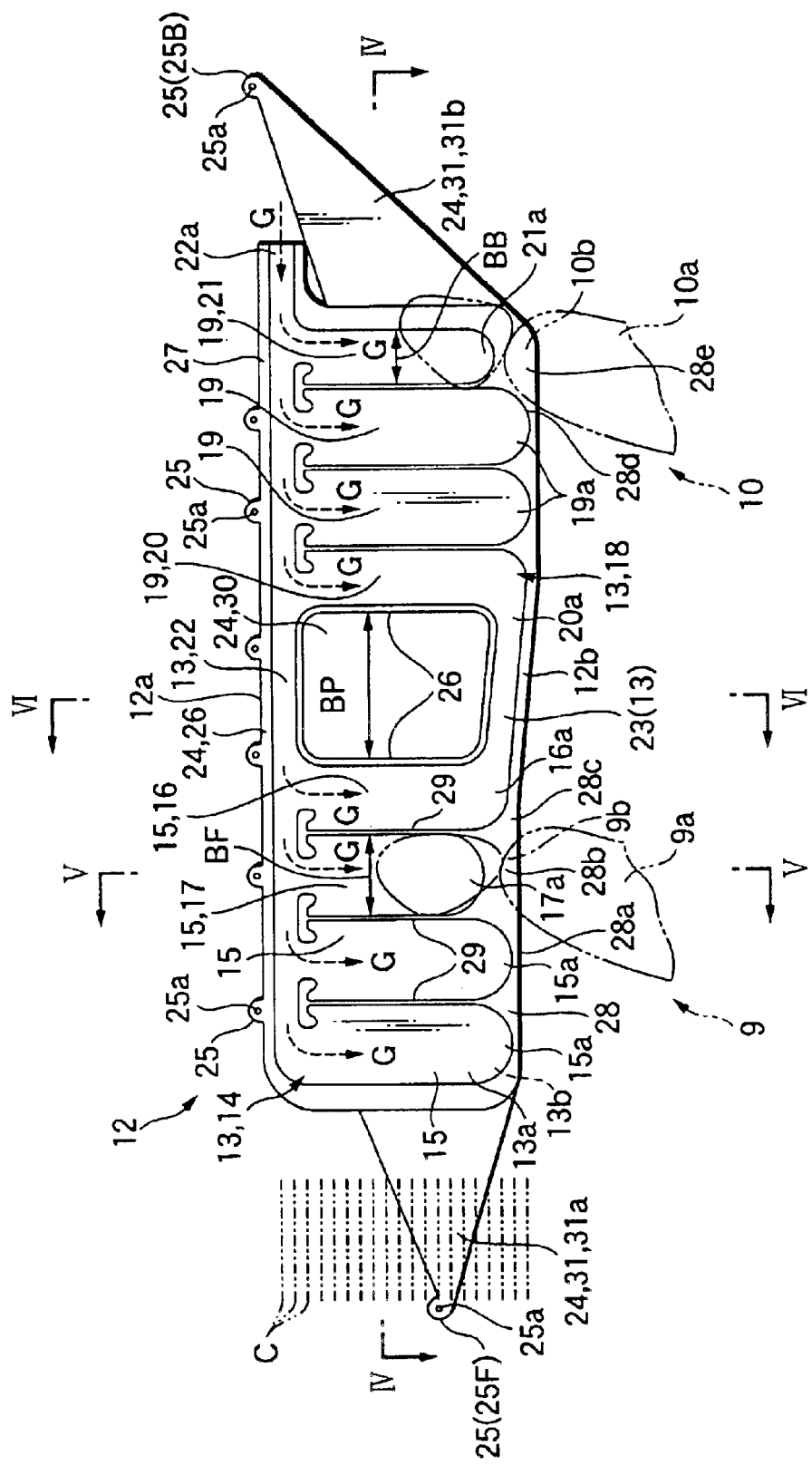
FIG. 3 is a front view showing a state that the air bag used in the embodiment is developed to be flat.
Figure 4:
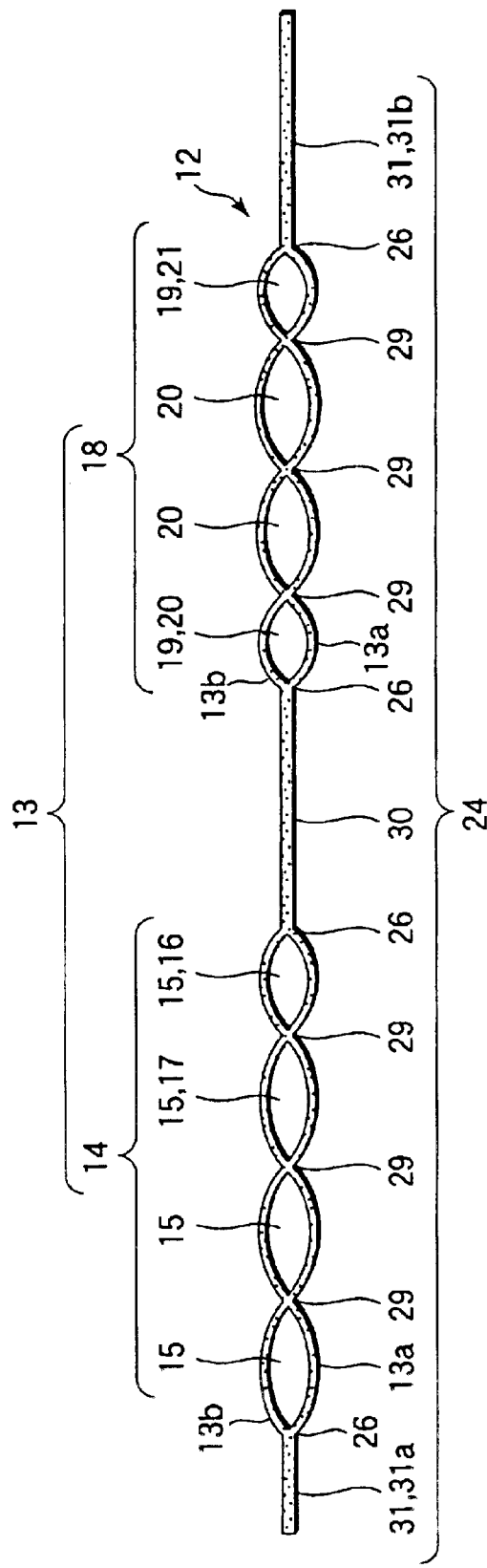
FIG. 4 is an enlarged, transverse sectional view showing the air bag of the embodiment when it is inflated as a simplex, the view showing a state that a portion taken on line IV—IV in FIG. 3 is inflated.
Figure 5:
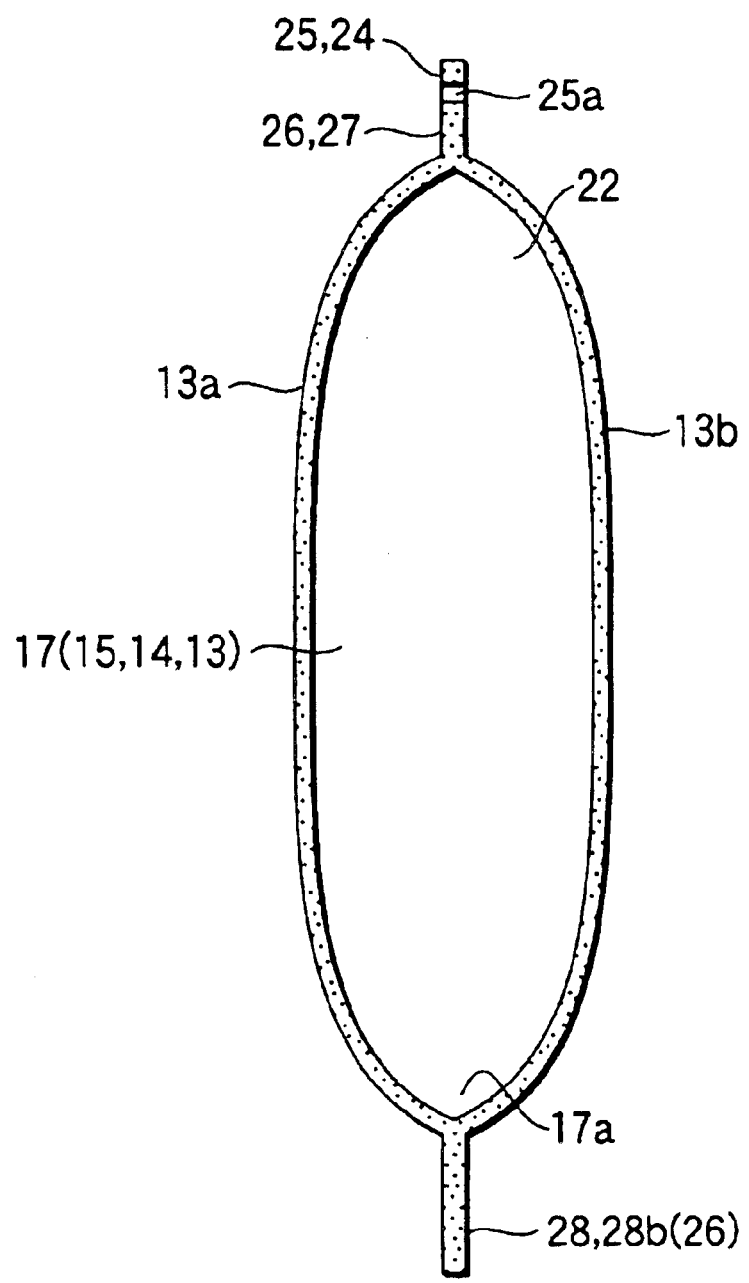
FIG. 5 is an enlarged, longitudinal sectional view showing the air bag of the embodiment when it is inflated as a simplex, the view showing a state that a portion taken on line V—V in FIG. 3 is inflated.
Figure 6:
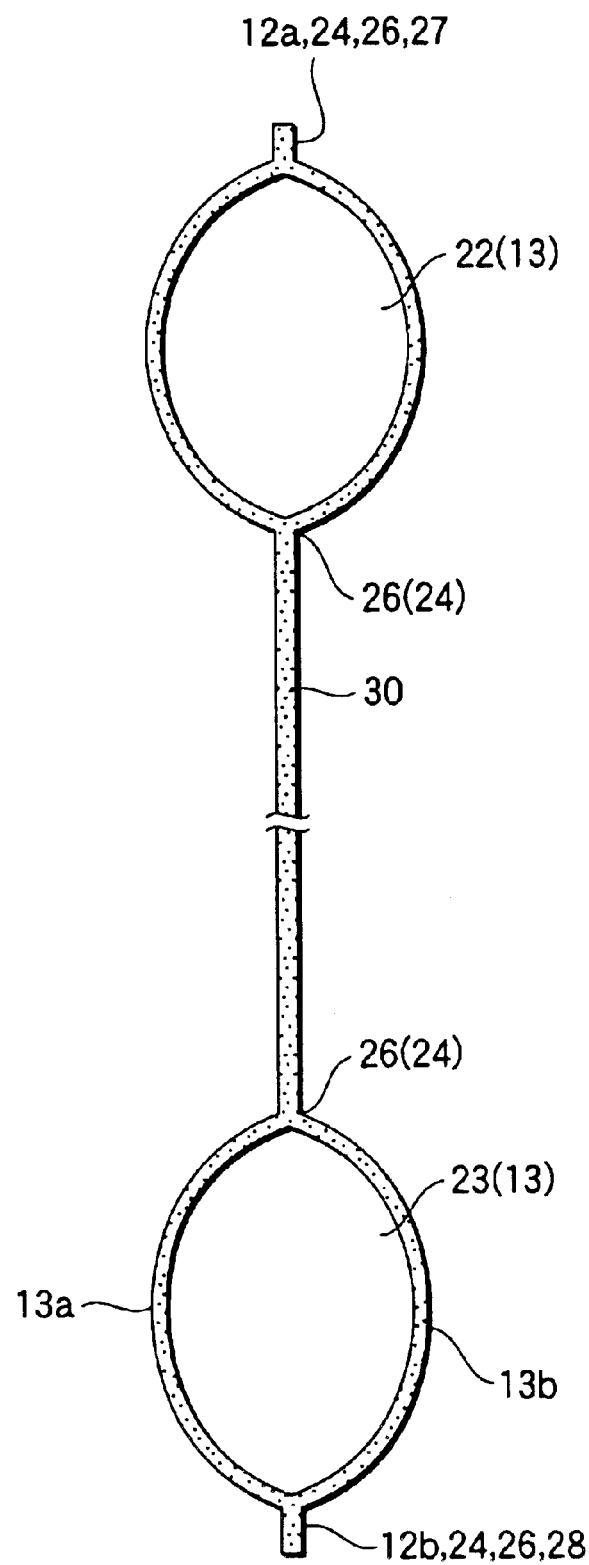
FIG. 6 is an enlarged, longitudinal sectional view showing the air bag of the embodiment when it is inflated as a simplex, the view showing a state that a portion taken on line VI—VI in FIG. 3 is inflated.

In the embodiment, the air bag 12 is formed with a hollow weave. To store the air bag 12, as shown in FIGS. 1 to 6, the air bag 12 folded is fed with inflation gas G from an inflator 35 to be developed, and then is stored in and along the upper fringe side of the periphery edges of the opening s W (W1 and Sw2) in a state that it is folded and covers the indoor side of the pillar garnish 7 of the center pillar part CP. The air bag 12, as shown in FIG. 3, includes a gas-inflow section 13, which receives the inflation gas G thereinto and inflates to separate a cabin-inside side wall 13a and a cabin-outside side wall 13b (see FIGS. 4 to 6), and a non gas-inflow section 24 which rejects inflation gas G.

In the embodiment, the gas-inflow section 13 includes two or front and rear inflatable protective shielding parts 14 and 18, a communication inflow part 22 and inflation communicating parts 23. The inflatable protective shielding part 14, located at the front side of the vehicle V, is provided under the front side of the communication inflow part 22, and inflates so as to cover the opening W1 in the upper part of the front seat 9 side (the cabin outside "O") of the vehicle V, when the air bag 12 develops and inflates. The inflatable protective shielding part 18, located at the rear side of the vehicle V, is provided under the rear side of the communication inflow part 22, and inflates so as to cover the opening W2 in the upper part of the rear seat 10 side (the cabin outside "O") of the vehicle V, when the air bag 12 develops and inflates.

The inflation communicating parts 23 are disposed in the longitudinal direction under and along a lower fringe 12b of the air bag 12 in the lower part of a plate-like portion 30 to be described later in a state that it communicates the lower part of the rear end of the front and rear inflatable protective shielding part 14 with the lower part of the front end of the rear inflatable protective shielding part 18.

The communication inflow part 22 includes an inflow port 22a located at the rear end thereof. The inflow port 22a is opened at the rear end, and cylindrical in shape while projecting from the air bag 12. The communication inflow part 22 is linearly extended from the inflow port 22a and reaches an upper part of the front inflatable protective shielding part 14. The inflow port 22a, already stated, is attached to the inflator 35.

The front and rear inflatable protective shielding parts 14 and 18 are parted by partitioning parts 29 to be described later, and vertically disposed, and includes a plurality of inflation parts 15 and 19, which are arranged in the longitudinal direction of the vehicle V. The front and rear inflatable protective shielding parts 14 and 18 generate tensions in the longitudinal direction when the inflation parts 15 and 19 complete their inflating operation.

The number of inflation parts 15 of the front inflatable protective shielding part 14 is four. The rearmost inflation part 15 serves as a plate-like portion side inflation part 16 which is in contact with the front edge of a plate-like portion 30 to be described later, and communicates its lower end 16a with the front end of the inflation communicating part 23. The second inflation part 15 as counted from the rear end serves as a lower-end displacement inflation part 17 of which the lower end 17a is displaced to a position which is higher than the remaining inflation parts 15 and 16. The lower-end displacement inflation part 17 is located at a position above the side of the seat recliner 9a of the front seat 9, and the lower end 17a is located above the upper end 9b of the side surface side (cabin outside "O") of the seat recliner 9a.

The lower ends 15a and 16a of the inflation parts 15 and 16, which are other than the lower-end displacement inflation part 17, are disposed to be lower than the upper end 9b of the seat recliner 9a.

The inflation parts 15 and 17 other than the plate-like portion side inflation part 16 are all constructed such that the lower ends 15a and 17a thereof are closed with the lower-edge side part 28 of a periphery part 26 (to be described later) in the non gas-inflow section 24. The upper ends of the inflation parts 15 inclusive of the plate-like portion side inflation part 16 and the lower-end displacement inflation part 17 communicate with the communication inflow part 22.

The number of the inflation parts 19 of the rear inflatable protective shielding part 18 is also four. The foremost inflation part 19 serves as a plate-like portion side inflation part 20, which is in contact with the rear end of the plate-like portion 30 to be described later, and its lower end 20a communicates with the rear end of the inflation communicating part 23. The rearmost inflation part 19 serves as a lower-end displacement inflation part 21 of which the lower end 21a is displaced to be higher than the remaining inflation parts 19 and 20. The lower-end displacement inflation part 21 is disposed above the side of the seat recliner 10a of the rear seat 10, and its lower end 21a is located above the upper end 10b of the side surface side (cabin outside "O") of the seat recliner 10a.

The lower ends 19a and 20a of the inflation parts 19 and 20 other than the lower-end displacement inflation part 21 are located below the upper end 9b of the seat recliner 9a.

The lower ends 19a and 20a of other inflation parts 19 and 21 than the plate-like portion side inflation part 20 are closed with the lower-edge side part 28 of the periphery part 26 to be given later in the non gas-inflow section 24. The upper ends of all of the inflation parts 19 inclusive of the plate-like portion side inflation part 20 and the lower-end displacement inflation part 21 communicates with the communication inflow part 22.

The width dimension BF of the lower-end displacement inflation part 17 of the front inflatable protective shielding part 14 as viewed in the longitudinal direction is larger than the width dimension BB of the lower-end displacement inflation part 21 of the rear inflatable protective shielding part 18 as viewed in the longitudinal direction.

In the instant embodiment, the width dimension BF of the lower-end displacement inflation part 17 as viewed in the longitudinal direction is within 150 to 300 mm(about 180 mm in the embodiment). The width dimension BB of the lower-end displacement inflation part 21 as viewed in the longitudinal direction is within 100 to 200 mm (about 120 mm in the embodiment).

The non gas-inflow section 24 is constructed such that the cabin-inside side wall 13a and the cabin-outside side wall 13b are coupled to each other, and it includes mounting parts 25, periphery parts 26, partitioning parts 29, and the plate-like portion 30. In the case of the embodiment, it further includes coupling parts 31.

The periphery parts 26 are located around the gas-inflow section 13 and also plate-like portion 30 at positions adjoining to the gas-inflow section 13, and tightly woven so as to inhibit gas leaking. The vertical length of the periphery parts 26 is long so that parts 28b and 28e of the lower-edge side part 28 of the periphery parts 26, which are located under the lower-end displacement inflation parts 17 and 21, are substantially level with parts 28a, 28c and 28d of the periphery parts 26 under the inflation parts 15, 16, 19 and 20, which are adjacent to the lower-end displacement inflation parts 17 and 21, in the lower edge height, when the air bag 12 is developed to be flat in a non inflating state (see FIG. 3).

A plurality (eight in the embodiment) of mounting parts 25 are disposed projecting above an upper edge side part 27 and the coupling parts 31 (front and rear coupling parts 31a and 31b) of the periphery parts 26, and mounting brackets 33 for mounting the air bag to the inner panel 2 are secured to the mounting parts. Mounting holes 25a through which mounting bolts 34 are to be passed are bored in the mounting parts 25.

The plate-like portion 30 is disposed on the front end side and the rear end side of the air bag 12, and cooperate with the front and rear coupling parts 31a and 31b to secure an overall configuration of the air bag 12. Further, it is provided for reducing the volume of the gas-inflow section 13 to reduce the time taken till the inflation of the air bag 12 is completed. The plate-like portion 30, rectangular in shape, is disposed between the plate-like portion side inflation part 16 of the front inflatable protective shielding part 14 and the plate-like portion side inflation part 20 of the rear inflatable protective shielding part 18, and between the communication inflow part 22 and the inflation communicating part 23, and at the mid position of the air bag 12 (gas-inflow section 13) as viewed in the longitudinal direction. In the embodiment, the plate-like portion 30 is disposed such that when the inflating operation of the air bag 12 completes, it covers a region from a position near the rear edge of the center pillar part CP to the cabin-inside side of the opening W2 located closer to the rear seat 10. The width dimension BP of the plate-like portion 30 as viewed in the horizontal direction is selected to be within a range from the width dimension substantially equal to that of the inflation parts 15 and 19 to a wide dimension of about 100 to 500 mm (350 mm in the embodiment).

In the embodiment, the coupling parts 31 are located at the front and rear ends of the air bag 12, respectively. Those coupling parts 31 longitudinally extend away from the gas-inflow section 13, and are coupled to the inner panel 2 of the body 1 of the vehicle V by the utilization of the mounting parts 25. The front and rear coupling parts 31a and 31b are shaped like rectangular plates, and coupled to the lower-edge side part 28 of the periphery parts 26 when the developing/inflating operation is completed. Those front and rear coupling parts are coupled together with the periphery parts 26 and the like into a unit form when the air bag 12 is hollow woven. In the coupling part 31a, a mounting part 25F is disposed at the front end, while being projected forward from the front edges of the periphery parts 26. The mounting part 25F is coupled to the inner panel 2 of the front pillar FP. In the coupling part 31b, a mounting part 25B is located at the rear end, while projecting rearward from the rear edge of the periphery parts 26. The mounting part 25B is coupled to the inner panel 2 of the roof side rail RR. The mounting part 25B is coupled to a position located rearwardly of the inflator 35, whereby the gas-inflow section 13 generates a tension in a direction as closest to the longitudinal direction as possible.

The partitioning parts 29 are each shaped like "T", which extends from the lower-edge side part 28 of he periphery parts 26 upward to the communication inflow part 22 within the regions of the front and rear inflatable protective shielding parts 14 and 18, and arranged in the longitudinal direction of the vehicle V. The partitioning parts 29 partition the space within the front and rear inflatable protective shielding parts 14 and 18 into a plurality of inflation parts 15 (16, 17), and 19 (20, 21). The partitioning parts are provided for generating a tension in the longitudinal direction in the front and rear inflatable protective shielding parts 14 and 18 when those receive inflation gas G to be inflated, and further for substantially uniformizing the thickness of each of the front and rear inflatable protective shielding parts 14 and 18. In other words, the partitioning parts generate tension in the longitudinal direction in a portion ranging from a position near the inflow port 22a to the front part of the air bag 12, viz., a portion from the mounting parts 25 at the rear end of the rear coupling part 31b to the mounting part 25 at the front end of the front coupling part 31a, whereby when the air bag 12 receives a pressing force directed to the cabin outside "I" or cabin outside "O", the air bag is little moved sideways.

Mounting of the head protection air bag device M to the vehicle will be described. To start with, an air bag 12 is folded. For a folding state, in the case of the embodiment, as indicated by two-dot chain lines in FIG. 3, folding of the air bag is repeated in opposite directions and holding edges C are formed at the crests and troughs, whereby the air bag is formed like bellows acting so as to move the lower fringe 12b toward the upper fringe 12a (see FIG. 2).

After folded, the air bag is wrapped with a tape 32 which may be broken (FIG. 2), in order to prevent its re-expansion. Then, the inflator 35 and the mounting brackets 33 and 36 are mounted on it, whereby an air bag assembly is formed.

Thereafter, the mounting brackets 33 and 36 are located at predetermined positions of the inner panel 2. The mount holes 25a or the like are passed therethrough and fastened by bolts 34 and 37. And the mounting brackets 33 and 36 are fastened to the inner panel 2, whereby the air bag assembly is mounted to the vehicle body 1. Thereafter, the side collision sensor 41, roll-over sensor 42 and control unit 43 are mounted on the vehicle V, and lead wires for operating signal inputting (not shown) led from the control unit 43 are connected to the inflator 35. Further, the pillar garnish 4 and the roof head lining 5 are attached to the vehicle body 1. Additionally, a rear pillar garnish 6 and a center pillar garnish 7 are attached to the vehicle body 1. Here, the head protection air bag device M is mounted on the vehicle V.

After the head protection air bag device M is mounted on the vehicle V, the control unit 43 receives a side collision detect signal from the side collision sensor 41 and inputs it to the inflator 35, and then the inflator 35 discharges inflation gas G. The inflation gas G, as indicated by a two-dot chain line, flows forward from the inflow port 22a within the communication inflow part 22 of the gas-inflow section 13, and flows downward from the communication inflow part 22 into the inflation parts 15 and 19. The front and rear inflatable protective shielding parts 14 and 18 of the air bag 12 start to inflate while bringing out of its folded state. The air bag 12 breaks the tape 32 with which the air bag is wrapped; forcibly opens the air bag cover 8 on the lower edge side of the pillar garnish 4 and the roof head lining 5. The air bag, as indicated by two-dot chain lines in FIGS. 1 and 2, greatly inflates so as to cover the cabin-inside side I of the openings W1 and W2, center pillar CP and the rear pillar RP, while projecting downward from the upper parts of the openings W1 and W2 toward the lower parts thereof.

In the head protection air bag device M of the embodiment, also when the control unit 43 inputs a roll-over detect signal derived from the roll-over sensor 42 to the inflator 35, the inflator operates. Also in this case, the air bag 12 receives the inflation gas G from the inflator 35, and breaks the wrapped tape 32. The air bag 12 breaks the tape 32 with which the air bag is wrapped, and forcibly opens the air bag cover 8 on the lower edge side of the pillar garnish 4 and the roof head lining 5. The air bag, as indicated by two-dot chain lines in FIGS. 1 and 2, greatly inflates so as to cover the cabin-inside side I of the openings W1 and W2, center pillar part CP the rear pillar RP, and the openings W1 and W2, while projecting downward.

In the head protection air bag device M of the embodiment, the folded air bag 12 receives the inflation gas G, and when its inflating operation is completed, the inflation parts 15 and 19 of the front and rear inflatable protective shielding parts 14 and 18 as partitioned by the partitioning parts 29 generate tensions in the longitudinal direction in the front and rear inflatable protective shielding parts 14 and 18 per se. The front and rear inflatable protective shielding parts 14 and 18 are interconnected to each other by the inflation communicating part 23 at the lower fringe 12b side of the air bag 12.

The inflation communication parts 23 are longitudinally disposed along the lower fringe 12b side of the air bag 12, and completes the inflation of the air bag. Therefore, the front and rear inflatable protective shielding parts 14 and 18 are interconnected without reducing the tensions in those parts. As a result, a high tension having the longitudinal direction is generated in the entire lower fringe 12b of the air bag 12.

The inflation parts 15 and 19 are interconnected such that only the plate-like portion side inflation parts 16 and 20, which are adjacent to each other with the plate-like portion 30 located therebetween are merely interconnected by the inflation communicating part 23. The remaining inflation parts 15 and 19 are closed at the lower-edge side parts 28 of the periphery parts 26. The lower ends thereof are not communicated with each other. Accordingly, even if the inflation communicating parts 23 are provided, the tension having a longitudinal direction in the inflatable protective shielding parts 14 and 18 per se, which is generated by the inflation parts 15 and 19, is kept in a high level.

Accordingly, a head protection air bag device M of the embodiment is capable of generating a high tension having a longitudinal direction of the vehicle at the lower fringe 12b side of the air bag 12 at the completion of developing and inflating the air bag.

Particularly in the lower side of the plate-like portion 30 in the air bag 12, the inflation communicating part 23 longitudinally disposed completes the inflating operation in a state that high tension having the longitudinal direction is generated in the lower fringe 12b side of the air bag. The front and rear inflatable protective shielding parts 14 and 18 generate tensions in the longitudinal direction when the inflation parts 15 and 19 complete their inflating operation. Accordingly, the air bag is high in rigidity, and difficult to be bent to the cabin outside "O". Therefore, even if the passenger is greatly moved out of the car cabin and pressed against the lower end in the vicinity of the lower end of the plate-like portion 30, the passenger can be restrained reliably.

Where attempt is made to generate high tension as in the embodiment mentioned above by additionally providing inflation parts 15 and 19 at the position of the plate-like portion 30 at the mid position of the air bag 12 as viewed in the longitudinal direction, if strong pressing force acts on the lower fringe 12b side at the position of the additional inflation parts, in the direction toward the car outside, the lower ends of the new inflation parts 15 and 19 are inevitably bent to the car outside, and the attempt fails to produce the useful operation and effects of the embodiment already described since the coupling of the inflation parts 15 and 19 on the lower fringe 12b side of the air bag is not strong firmly.

Provision of the inflation parts 15 and 19 at the position of the plate-like portion 30 in the air bag 12 of the embodiment will increase the volume of the gas-inflow section 13, and hence increase the time taken till the inflation of the air bag 12 is completed. In the air bag 12 of the embodiment, the plate-like portion 30 of the non gas-inflow section 24 which rejects the flowing of gas into the air bag is provided above the inflation communicating part 23. Accordingly, the volume of the gas-inflow section 13 may be reduced when comparing with the case where the inflation parts 15 and 19 are located at the position of the plate-like portion 30. Accordingly, the time taken till the inflation of the air bag 12 is completed, is reduced.

In the embodiment, the front and rear coupling parts 31a and 31b, which extend away from the gas-inflow section 13, and are coupled to the inner panel 2 in the body 1 of the vehicle V, are coupled to the lower-edge side part 28 of the periphery parts 26 of the air bag 12. The tension having the longitudinal direction is generated in high level in the lower fringe 12b side of the air bag 12 at the completion of the inflating operation.

In the embodiment, the front and rear coupling parts 31a and 31b, shaped like rectangular plates, are provided at the front and rear ends of the air bag 12. The front and rear coupling parts 31a and 31b may be formed in the form of belts coupled to only the lower-edge side part 28 side of the periphery parts 26 if those include the front ends of the mounting parts 25F and 25B. Further, the coupling part may be provided at only one end of the gas-inflow section 13 as longitudinally viewed.

In the head protection air bag device M of the embodiment, the lower-end displacement inflation parts 17 and 21 are disposed such that the lower ends 17a and 21a of them are located at positions above the lower ends 15a, 16a, 19a and 20a of the remaining inflation parts 15, 16, 19 and 20, and the air bag inflates without any interference with the upper ends 9b and 10b of the seat recliners 9a and 10b of the front seats 9 and 10. Specifically, if the inflation parts 15 and 19 as folded are developed and inflated downward from the upper fringe side (upper fringe 12a side of the air bag) of the openings W1 and W2 by the inflation gas G flowing downward from the upper part closer to the communication inflow part 22 to the lower ends 15a, 16a, 17a, 19a, 20a, and 21a, the lower ends 17a and 21a of the lower-end displacement inflation parts 17 and 21 do not interfere with the upper ends 9b and 10b of the seat recliners 9a and 10a, which are located cabin outside "O". And the remaining inflation parts 15, 16, 19 and 20 are disposed such that the lower ends 15a, 16a, 19a and 20a of them are located at positions lower than the upper ends 9b and 10b of the seat recliners 9a and 10a of the front seats 9 and 10. Accordingly, those may be developed and inflated so as to broadly cover the openings W1 and W2 on the cabin-inside side. The developing/inflating operation of the entire air bag 12 may be completed without any hindrance.

Accordingly, in the head protection air bag device M of the embodiment, even in such a construction that the air bag 12 broadly covers the openings W1 and W2 on the cabin-inside side, the air bag 12 may be developed and inflated without any interference of the seat recliners 9a and 10a with the front seats 9 and 10.

Further, in the head protection air bag device M of the embodiment, parts 28b and 28e of the lower-edge side part 28 of the periphery parts, which are located under the lower-end displacement inflation parts 17 and 21, as shown in FIG. 3, are substantially level with parts 28a, 28c and 28d of the lower-edge side part 28 under the inflation parts 15, 16, 19 and 20, which are adjacent to the lower-end displacement inflation parts 17 and 21, in the lower edge height and in the longitudinal direction of the vehicle V, when the air bag 12 is developed to be flat in a non inflating state.

For this reason, if the lower-end displacement inflation parts 17 and 21 are disposed such that the lower ends 17a and 21a of them are located at positions above the lower ends 15a, 16a, 19a and 20a of the remaining inflation parts 15, 16, 19 and 20 when the developing/inflating operation of the air bag 12 is completed, the parts 28b and 28e of the lower-edge side part 28 under the lower-end displacement inflation parts 17 and 21, as indicated by two-dot chain lines in FIG. 2, interfere with the upper ends 9b and 10b of the seat recliners 9a and 10a and are disposed, while being bent to the cabin outside "O", so that their lower edge side are made to be coincident, as much as possible, with the parts 28a, 28c and 28d of the lower-edge side part 28 of the periphery parts at the lower side of the adjacent inflation parts 15, 16, 19 and 20 substantially in the longitudinal direction. Accordingly, there is no case where the tension having the longitudinal direction generated in the lower fringe 12b side of the air bag 12 is reduced. Therefore, even if the air bag 12 receives the pressing force directed to the cabin outside "I" or cabin outside "O" at the completion of the developing/inflating operation, its sideways motion is suppressed and the passenger can reliably be retrained.

In particular, in the air bag 12 of the embodiment, a plurality of inflation parts 15, 16, 17, 20 and 21 are arranged side by side in the longitudinal direction. In the case of the embodiment, at the time of developing/inflating operation, a tension is generated in the longitudinal direction of the vehicle V. In the embodiment, a tension is generated in the longitudinal direction also in the lower fringe 12b side of the air bag 12. Therefore, even if at the completion of the developing/inflating operation, its sideways motion to the cabin outside "I" or cabin outside "O" is reliably suppressed, and the passenger can more reliably be retrained.

It is a common practice that an adjustable range of the front seat 9 of the vehicle V in the longitudinal direction is longer than of the rear seat 10, and that even when the front seat 9 is adjusted over a long range in the longitudinal direction, the width dimension BF (as longitudinally viewed) of the lower-end displacement inflation part 17 of the front inflatable protective shielding part 14 is larger than that of the lower-end displacement inflation part 21 of the rear inflatable protective shielding part 18. Therefore, when the lower-end displacement inflation part 17 of the front inflatable protective shielding part 14 is developed and inflated, the lower end 17a of the lower-end displacement inflation part 17 is prevented from interfering with the upper end 9b of the seat recliner 9a of the front seat 9. As a result, the head protection air bag device M is smoothly operable even when it is mounted on the vehicle V provided with the front and rear seats 9 and 10.

An adjustment range of an inclination angle of the seat recliner 9a of the front seat 9 is larger than that of the seat recliner 10a of the rear seat 10. If the inclination angle of the seat recliner 9a of the front seat 9 is greatly adjusted, the air bag 12 of the head protection air bag device M of the embodiment is easily adaptable for it.

In the head protection air bag device M of the embodiment, the control unit 43 for operating the inflator 35 receives a roll-over detect signal, which predicts a roll-over (turn-over) of the vehicle V, from the roll-over sensor 42, and sends it to the inflator, and operates the same. Specifically, in the embodiment, both at the time of side collision and at the time of the roll-over, the air bag 12 is developed and inflated to broadly cover the openings W1 and W2 on the cabin-inside side. Accordingly, the air bag 12 reliably protects the passenger at the time of over rolling as well as at the time of the side-collision of the vehicle V.

Figure 7:
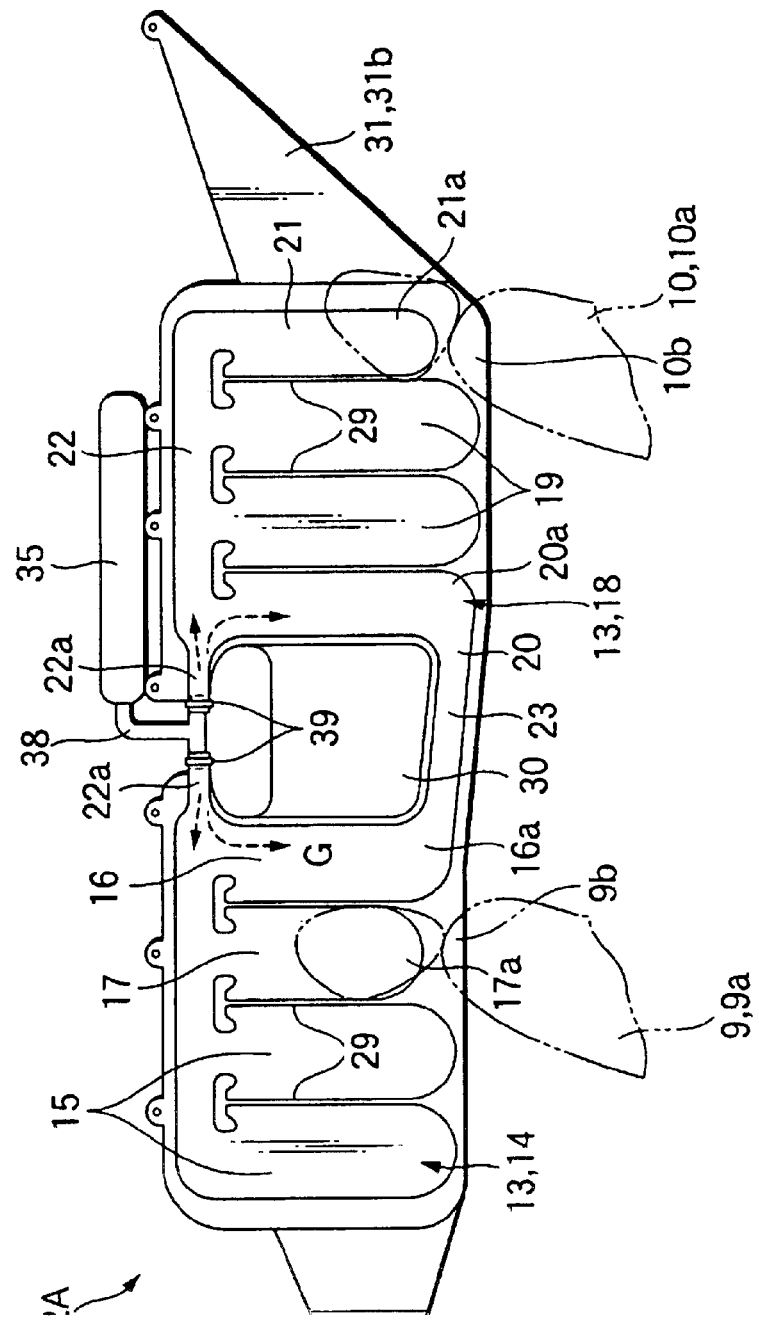
FIG. 7 is a front view showing a state that an air bag used in another embodiment is developed to be flat.

The air bag of the head protection air bag device M may be an air bag 12A as shown in FIG. 7. In the air bag 12A, two inflow ports 22a for feeding inflation gas G into the front and rear inflatable protective shielding parts 14 and 18 are provided above the plate-like portion 30 while corresponding to the front inflatable protective shielding parts 14 and 18. A gas supplying part 38 of which the lower end is shaped like an inverse T, is coupled to the inflator 35. The two cylindrical inflow ports 22a are applied to the legs of the bifurcated gas supplying part 38, and coupled to the gas supplying part 38 by use of clamps 39.

In the air bag 12A, the front and rear inflatable protective shielding parts 14 and 18, which are adjacently located with the plate-like portion 30 being interposed therebetween, receive inflation gas G from the inflow ports 22a disposed above the plate-like portion 30. Therefore, in the instant air bag 12A, a flowing distance of the inflation gas G till it reaches the front inflatable protective shielding part 14 is shorter than that in the air bag 12 in which the inflation gas G is fed into air bag from one of the ends of the gas-inflow section 13 (as longitudinally viewed). The volume of the communication inflow part 22 is also small. Accordingly, the time from the inflation start till inflating operation ends is reduced.

Figure 8:
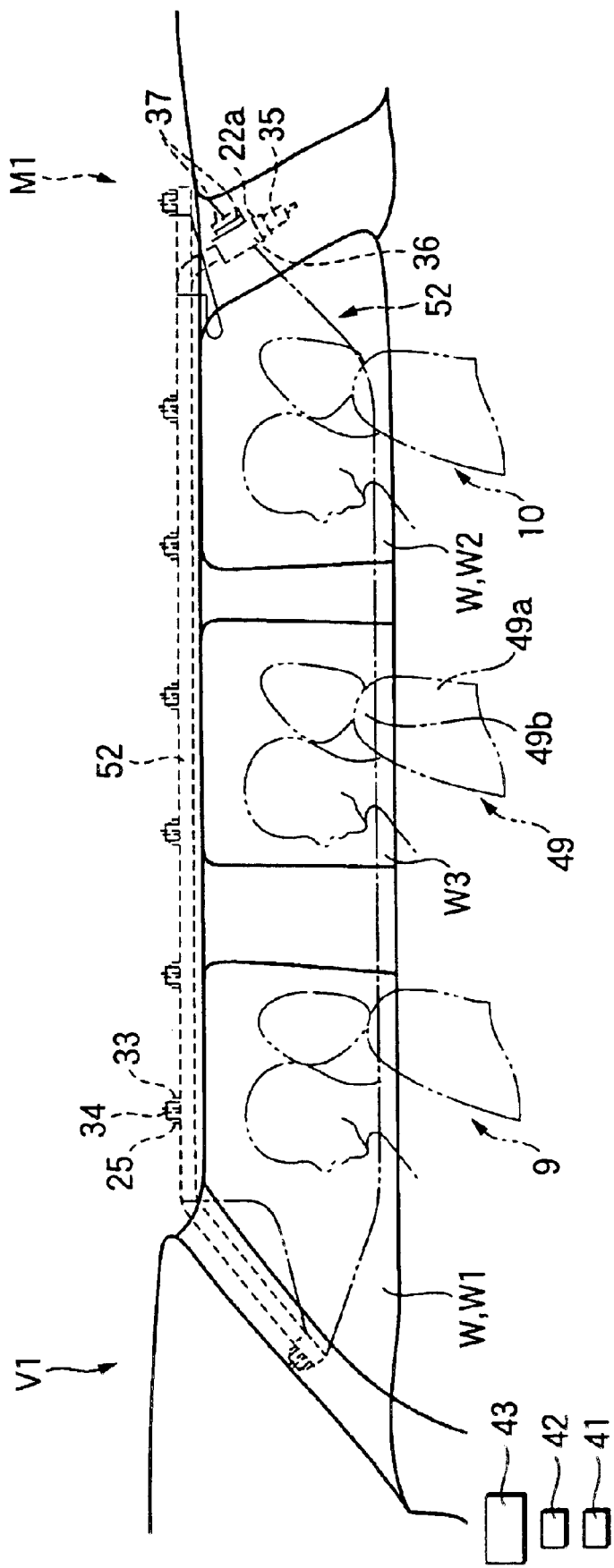
FIG. 8 is a front view showing a use of a head protection air bag device as viewed from the cabin-inside side, which is another embodiment of the invention.
Figure 9:
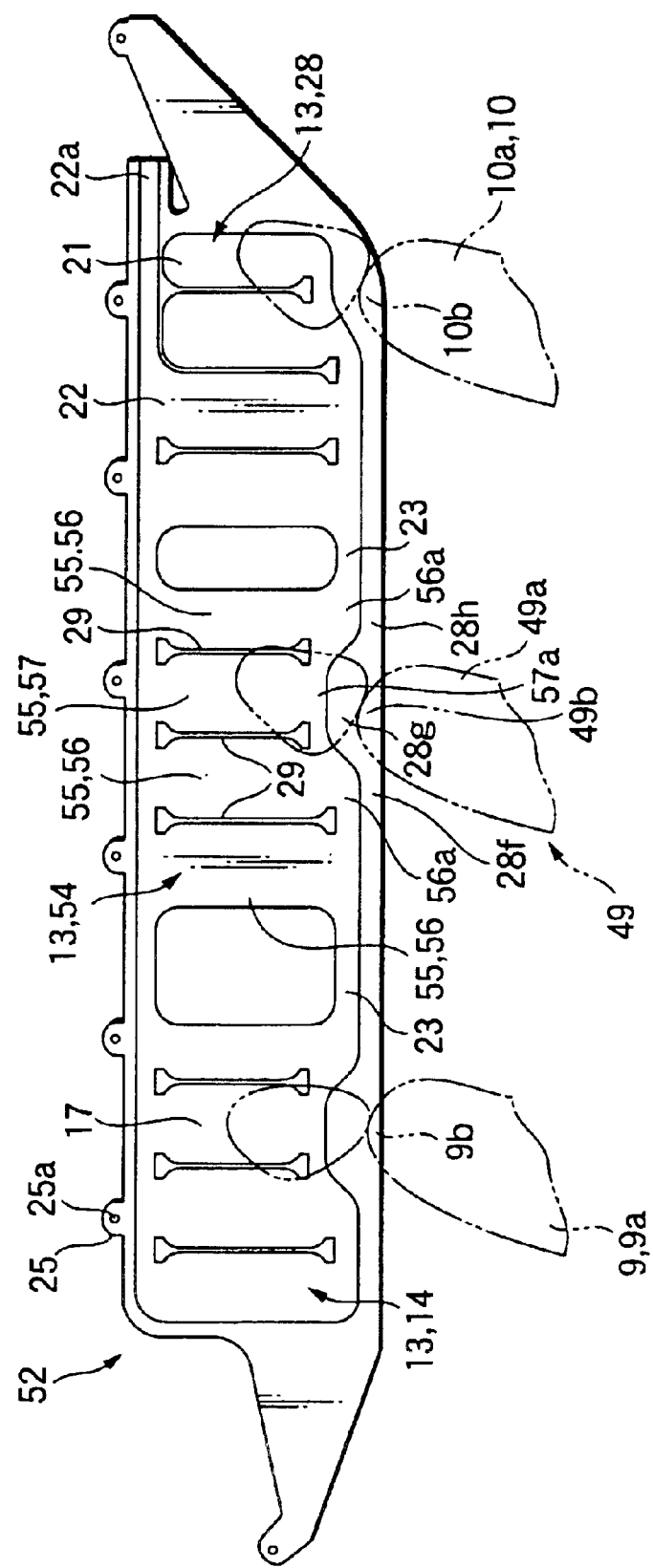
FIG. 9 is a front view showing a state that an air bag used in the FIG. 8 embodiment is developed to be flat.

In the embodiment, the head protection air bag device M to be mounted on the vehicle V provided with two rows of seats, front and rear seats, is discussed. If required, an air bag 52 may be constructed so as to be adaptable for a vehicle V1 provided with three rows of seats, a front seat 9, a rear seat 10 and an intermediate seat 49 located therebetween, as in a head protection air bag device M1 shown in FIGS. 8 and 9.

Also in the air bag 52, a measure is taken for avoiding the interference with the cabin-outside side upper end 49b of the seat recliner 49a of the intermediate seat 49. Of the inflation parts 55 of the inflatable protective shielding part 54, which cover the intermediate opening W3, the inflation part 55 located on the side of the seat recliner 49a of the intermediate seat 49 serves as a lower-end displacement inflation part 57 of which the lower end 57a is located above the lower ends 55a and 56a of the remaining inflation parts 55 and 56, and its lower edge side is substantially level with the upper end of the seat recliner 49a and parts 28f and 28h of the lower-edge side part 28 under the remaining inflation parts 55 and 56, which are adjacent to the lower-end displacement inflation part 57.

The air bag 52 thus constructed produces the operation and effects comparable with those of the air bags 12 and 12A.

In the embodiment, the air bag 12 is formed with a hollow weave. If required, the air bag may be formed by welding or the like by utilizing sewing, bonding, high frequency welder or the like.

Further, the present invention is not limited to the above-mentioned embodiments. It can be carried out in various modes without departing from the scope of the invention.

What is claimed is:

1. A head protection air bag device having an air bag which is stored, while being folded, along an upper fringe of an opening on a cabin-inside or indoor side of a vehicle, when receiving inflation gas, said air bag developing and inflating to cover an opening, wherein said air bag includes a gas-inflow section which inflates so as to separate a cabin-inside side wall and a cabin-outside side wall one from the other, a non gas-inflow section which rejects inflation gas and a periphery part surrounding said non gas-inflow section, said gas-inflow section includes a plurality of inflatable protective shielding parts being disposed such that said inflatable protective shielding parts are longitudinally spaced from one another and cover said opening, and inflation communicating parts, each of said inflatable protective shielding parts includes a plurality of inflating parts which are arranged in a longitudinal direction and are vertically expandable so as to generate a tension in the longitudinal direction, a plate-like portion disposed between said inflatable protective shielding parts, and partitioning parts being vertically disposed and defining said inflating parts in said inflatable protective shielding parts, said inflation communicating parts are disposed in and along a lower fringe side of said air bag under said plate-like portion, said inflatable protective shielding parts, which are adjacently located with said plate-like portion being interposed therebetween, are communicated with each other by said inflation communicating parts, and the lower ends of said inflating parts are closed at peripheral lower-edge sides thereof.

2. A head protection air bag device according to claim 1, wherein one of the ends of said air bag is coupled to a body of the vehicle by coupling parts extending away from said gas-inflow section and said coupling parts are coupled to the periphery part of the airbag when inflated.

3. A head protection air bag device according to claim 1, wherein said inflatable protective shielding parts, which are adjacently located with said plate-like portion being interposed therebetween, include inflow ports allowing said inflation gas to flow thereinto which are located above said plate-like portion.

* * * * *